United States Patent [19]

Nakajima et al.

[11] Patent Number: 5,640,847
[45] Date of Patent: Jun. 24, 1997

[54] CATALYST DETERIORATION DIAGNOSIS SYSTEM FOR INTERNAL COMBUSTION ENGINE

[75] Inventors: Yuki Nakajima, Yokosuka; Hideki Uema, Zushi, both of Japan

[73] Assignee: Nissan Motor Co., Ltd., Yokohama, Japan

[21] Appl. No.: 544,463

[22] Filed: Oct. 18, 1995

[30] Foreign Application Priority Data

Oct. 20, 1994 [JP] Japan ................................ 6-254062

[51] Int. Cl.$^6$ ............................................. F01N 3/00
[52] U.S. Cl. ............................................. 60/276; 60/277
[58] Field of Search ................................. 60/276, 277

[56] References Cited

U.S. PATENT DOCUMENTS

| | | | |
|---|---|---|---|
| 5,177,959 | 1/1993 | Schnaibel et al. | 60/274 |
| 5,307,626 | 5/1994 | Maus et al. | 60/277 |
| 5,317,868 | 6/1994 | Blischke et al. | 60/274 |
| 5,335,538 | 8/1994 | Blischke et al. | 73/118.1 |
| 5,533,332 | 7/1996 | Uchikawa | 60/277 |
| 5,557,929 | 9/1996 | Sato et al. | 60/277 |
| 5,568,725 | 10/1996 | Uchikawa | 60/277 |

FOREIGN PATENT DOCUMENTS

| | | |
|---|---|---|
| 40 09 901 | 10/1991 | Germany . |
| 41 28 823 | 3/1993 | Germany . |
| 41 40 618 | 6/1993 | Germany . |
| 42 11 116 | 10/1993 | Germany . |
| 63-205441 | 8/1988 | Japan . |
| 4-1449 | 1/1992 | Japan . |

Primary Examiner—John T. Kwon
Attorney, Agent, or Firm—Foley & Lardner

[57] ABSTRACT

A catalyst deterioration diagnosis system for an internal combustion engine having an exhaust gas passageway in which a catalytic converter having a catalyst is disposed. The diagnosis system comprises a first air-fuel ratio sensor disposed in the exhaust gas passageway upstream of the catalytic converter, and a second air-fuel ratio sensor disposed in the exhaust gas passageway downstream of the catalytic converter. The diagnosis system further comprises a control unit connected to the air-fuel ratio sensors and arranged to make an air-fuel ratio feedback control mainly in response to an output signal of the first air-fuel ratio sensor. The control unit includes means for calculating an inversion ratio value relating to an inversion ratio of output signals from the first and second air-fuel ratio sensors when the engine operating condition is within a diagnosis region requiring a diagnosis of deterioration of the catalyst, means for detecting an inversion state value relating to a state of inversion of the output signal of the first air-fuel ratio sensor, means for setting a decision standard value in accordance with the inversion state value from the inversion state value detecting means, and means for judging the deterioration of the catalyst by comparing the inversion ratio value from the inversion ratio value calculating means with the decision standard value from the decision standard value setting means.

6 Claims, 10 Drawing Sheets

CATALYST DETERIORATION DIAGNOSIS SYSTEM FOR INTERNAL COMBUSTION ENGINE

BACKGROUND OF THE INVENTION

1. Field of the Invention

This invention relates to improvements in a catalyst deterioration diagnosis system for an internal combustion engine, arranged to diagnose a deteriorating condition of a catalyst by using two air-fuel ratio sensors which are disposed upstream and downstream of a catalytic converter including the catalyst.

2. Description of the Prior Art

A variety of catalyst deterioration diagnosis systems for an internal combustion engine have been proposed and put into practical use. A typical one of these deterioration diagnosis systems is disclosed, for example, in Japanese Patent Provisional Publication No. 63-205441, in which two air-fuel ratio (or oxygen) sensors are disposed respectively upstream and downstream of a catalytic converter (including a catalyst) of the engine so that diagnosing deterioration of the catalyst is accomplished in accordance with comparison of output signals from the respective sensors while an air-fuel ratio feedback control is accomplished mainly in accordance with the output signal from the upstream-side oxygen sensor.

Figures 7A, 7B:
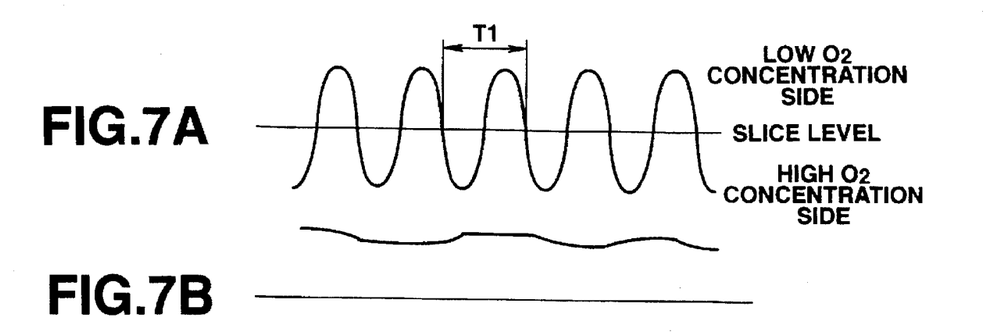
FIG. 7A is a wave form chart showing an inversion state of an output signal of an upstream-side air-fuel ratio (oxygen) sensor.
FIG. 7B is a wave form chart corresponding to FIG. 7A and showing a state of an output signal of a downstream-side air-fuel ratio (oxygen) sensor under a condition in which a catalyst is normal.

More specifically, during execution of the air-fuel ratio feedback control, fuel supply to the engine is controlled mainly in accordance with the output signal from the upstream-side oxygen sensor, for example, under a false proportional plus integral control so that the output signal from the upstream-side oxygen sensor periodically repeats inversion between a low oxygen concentration side and a high oxygen concentration side relative to a slice level corresponding to a stoichiometric air-fuel ratio as shown in FIG. 7A. This exhibits that the concentration of residual oxygen on the upstream side of the catalytic converter largely changes. In contrast, on the downstream side of the catalytic converter, change of the residual oxygen concentration is mild under an oxygen storing capability of the catalyst and therefore the output signal from the downstream-side oxygen sensor is as shown in FIG. 7B in which the change of the output signal is small in amplitude and long in cycle.

Figure 7C:
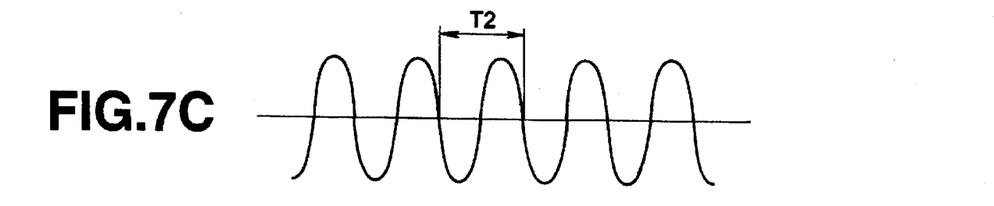
FIG. 7C is a wave form chart corresponding to FIG. 7A and showing an inversion state of the output signal of the downstream-side air-fuel ratio (oxygen) sensor under a condition in which the catalyst has deteriorated.

When deterioration of the catalyst in the catalytic converter proceeds, the oxygen storing capability of the catalyst is lowered so that the oxygen concentrations on the upstream and downstream sides of the catalytic converter becomes similar to each other. As a result, the output signal from the downstream-side oxygen sensor repeats its change in a cycle similar to that of the output signal from the upstream-side oxygen sensor, increasing its amplitude, as shown in FIG. 7C. Accordingly, with the catalyst deterioration diagnosis system of Japanese Patent Provisional Publication No. 63-205441, an inversion cycle T1 of the output signal from the upstream-side oxygen sensor between the low and high concentration sides and an inversion cycle T2 of the output signal from the downstream-side oxygen sensor between the rich and lean sides are measured to determine a ratio (T1/T2) between the inversion cycles T1 and T2. Then, when this ratio exceeds a predetermined level, it is judged that the catalyst has been deteriorated.

Another catalyst deterioration diagnosing system is disclosed in Japanese Patent Provisional Publication No. 4-1449, in which a catalyst is finally judged to have deteriorated when a condition of a ratio (f2/f1) exceeding a predetermined value is detected a predetermined plurality of times. The ratio (f2/f1) is between a frequency (f1) of inversion between high and low oxygen concentration sides of an output signal from an upstream-side oxygen sensor and a frequency (f2) of inversion between lean and rich sides of an output signal from a downstream-side oxygen sensor.

Figure 8:
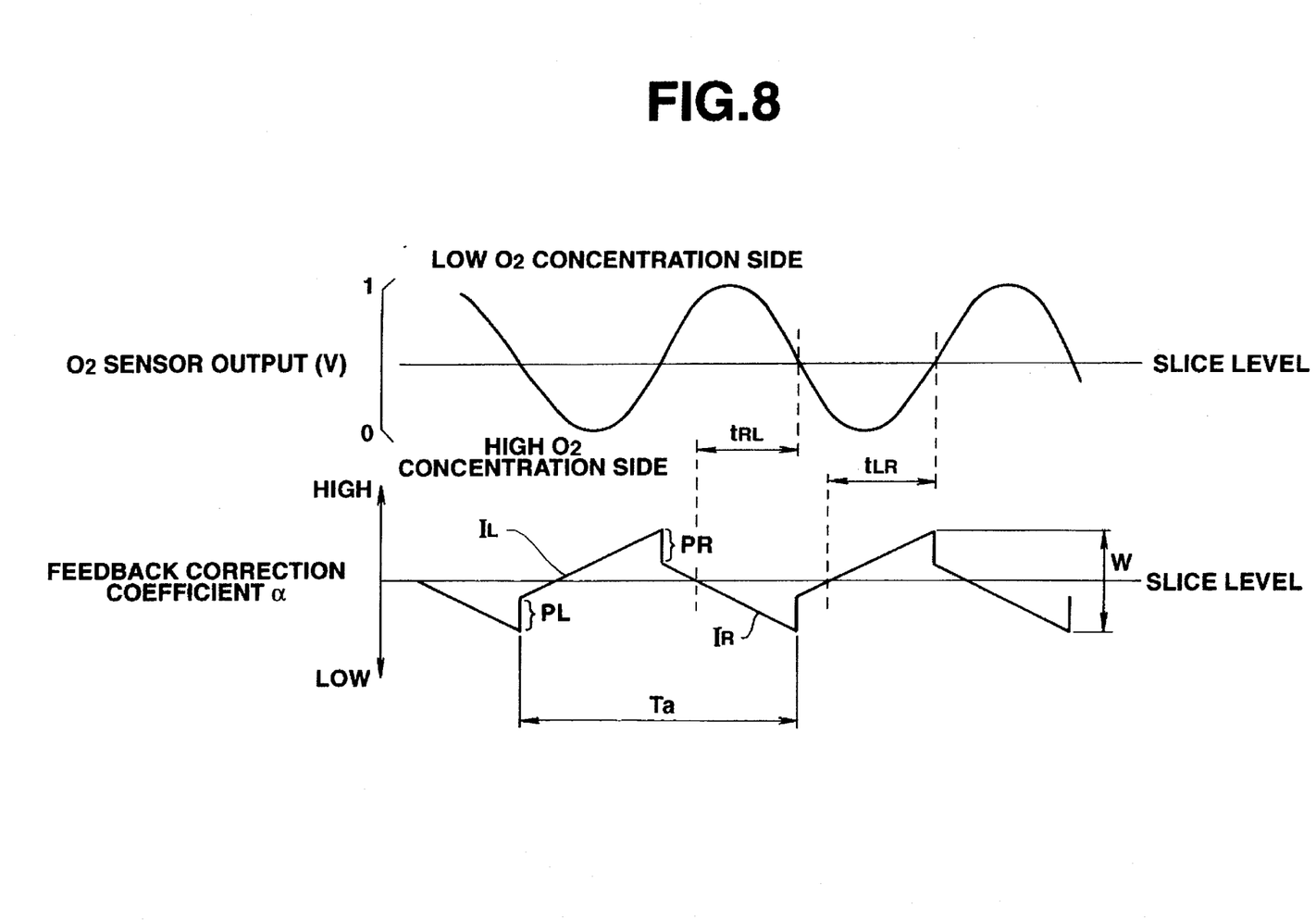
FIG. 8 is a wave form chart showing at its upper part an inversion state of the upstream-side oxygen sensor, and at a lower part a corresponding state of an air-fuel ratio feedback correction coefficient (α)

However, drawbacks have been encountered in the above conventional catalyst deterioration diagnosis systems, which will be discussed hereinafter with reference to FIGS. 8A and 8B.

FIG. 8 shows at its upper part an example of the change of the output signal from the upstream-side oxygen sensor between the low oxygen concentration side and the high oxygen concentration side, and at its lower part a change of a feedback correction coefficient $\alpha$ corresponding to the change of the output signal. The feedback correction coefficient $\alpha$ is obtained, for example, by the false proportional plus integral control. More specifically, when a curve of the output of the oxygen sensor crosses the line of the slice level corresponding to the stoichiometric air-fuel ratio so as to be inverted from the low oxygen concentration side to the high oxygen concentration side, a predetermined proportional amount PL is added to the feedback correction coefficient $\alpha$ and additionally an integral amount with an inclination corresponding to a predetermined integration constant IL is gradually added to the feedback correction coefficient $\alpha$. This feedback correction coefficient $\alpha$ is raised to a basic fuel injection amount as well known. Thus, actual air-fuel ratio is gradually made rich (in fuel). Then, when the curve of the output signal from the oxygen sensor has been inverted from the high oxygen concentration side to the low oxygen concentration side, a predetermined proportional amount PR is subtracted from the feedback correction coefficient $\alpha$, and additionally an integral amount with an inclination corresponding to a predetermined integration constant IR is gradually subtracted from the feedback correction coefficient $\alpha$. Upon repetition of the above operation, the air-fuel ratio is maintained at values near the stoichiometric air-fuel ratio while making a small variation in its level.

Here, assuming that the engine is under a steady state operation, the slice level corresponding to the stoichiometric air-fuel ratio is to reside generally at a vertical center of the amplitude of the air-fuel ratio feedback correction coefficient $\alpha$ as shown at the lower part of FIG. 8. It is to be noted that times tLR, tRL indicated in FIG. 8 is regarded as a control delay in a feedback control system, each of the times tLR, tRL being a time for which the output signal from the oxygen sensor is actually inverted into its low oxygen concentration side or its high oxygen concentration side upon the periodically changing feedback control correction coefficient $\alpha$ crossing the slice level corresponding to the stoichiometric air-fuel ratio.

Figure 9A:
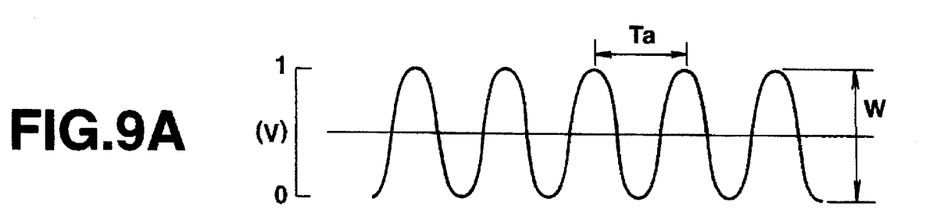
FIG. 9A is a wave form chart showing an inversion state of the output signal of the upstream air-fuel ratio (oxygen) sensor under a condition in which the catalyst is normal.
Figure 9B:
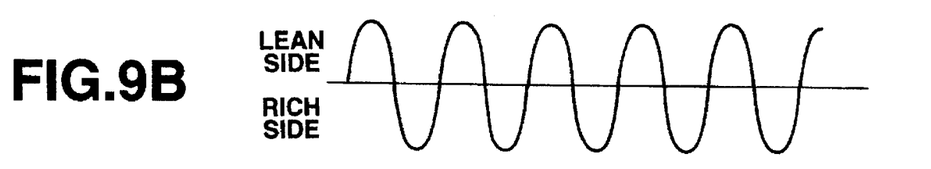
FIG. 9B is a wave form chart corresponding to FIG. 9A and showing an air-fuel ratio on the upstream side of the catalyst.
Figure 9C:
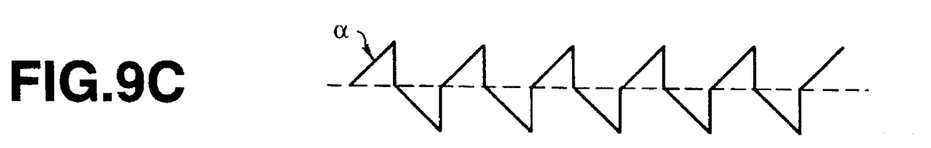
FIG. 9C is a wave form chart corresponding to FIG. 9A and showing the air-fuel ratio feedback correction coefficient (α)
Figure 9D:
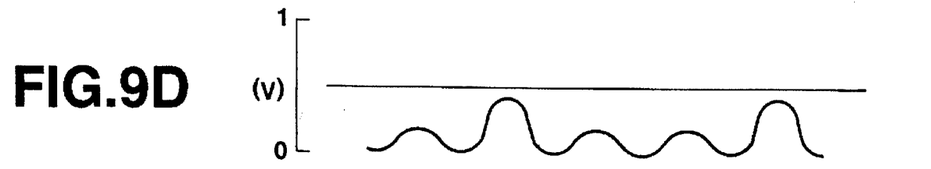
FIG. 9D is a wave form chart corresponding to FIG. 9A and showing a state of the output signal of the downstream-side air-fuel ratio (oxygen) sensor.

In case that the upstream-side air-fuel ratio (oxygen) sensor has not deteriorated and is normal, an increase and decrease cycle Ta of the feedback correction coefficient $\alpha$ is relatively short while decreasing the amplitude W as shown in FIG. 9A. As a result, the downstream-side oxygen sensor is hardly affected with exhaust gas passing through the catalytic converter, so that the output signal from the downstream-side oxygen sensor hardly has inversion between the rich side and lean side as shown in FIG. 9D if the catalytic converter is normal.

Figure 10A:
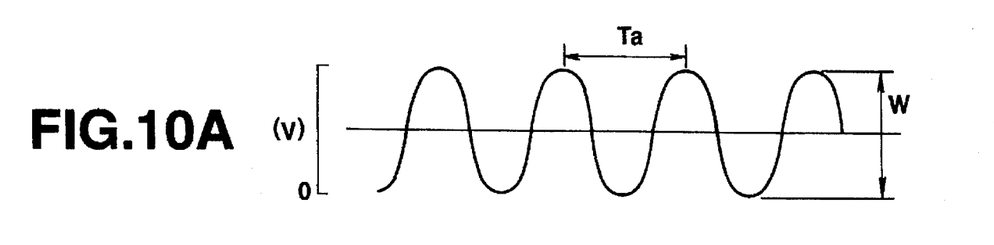
FIG. 10A is a wave form chart showing an inversion state of the output signal of the upstream air-fuel ratio (oxygen) sensor under a condition in which the catalyst has deteriorated.
Figure 10B:
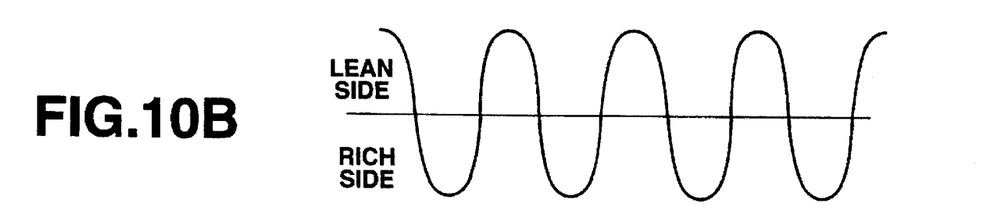
FIG. 10B is a wave form chart corresponding to FIG. 10A and showing an air-fuel ratio on the upstream side of the catalyst.
Figure 10C:
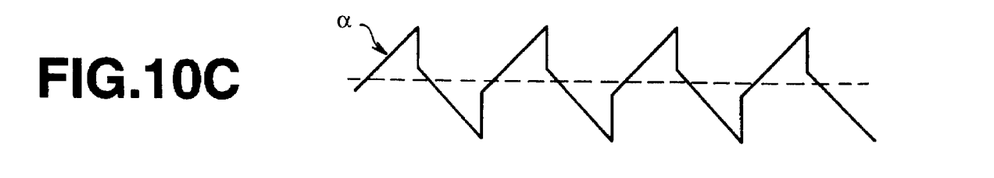
FIG. 10C is a wave form chart corresponding to FIG. 10A and showing the air-fuel ratio feedback correction coefficient (α)
Figure 10D:
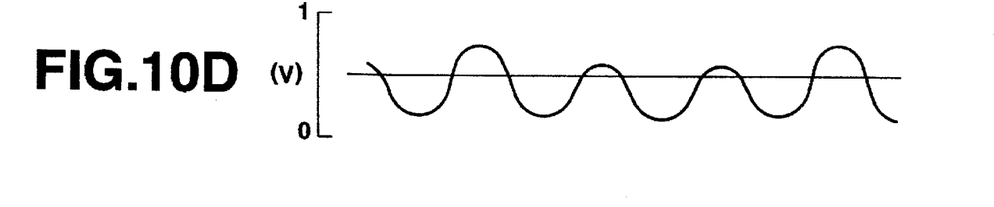
FIG. 10D is a wave form chart corresponding to FIG. 10A is a state of the output signal of the downstream-side air-fuel ratio (oxygen) sensor.

In contrast, in case that the upstream-side air-fuel ratio (oxygen) sensor has deteriorated to increase a response delay in air-fuel ratio feedback control, the increase and decrease cycle Ta of the feedback correction coefficient α increases while increasing the amplitude W. In this case, change of the air-fuel ratio is increased over the oxygen storing capability of the catalytic converter, and therefore inversion between the low and high oxygen concentration sides will appear in the output signal from the downstream-side oxygen sensor as shown in FIG. 10D even though the catalytic converter is normal. As a result, there is the possibility of the catalyst in the catalytic converter being erroneously diagnosed to be deteriorated, even though the catalyst has a normal ability or performance.

SUMMARY OF THE INVENTION

It is an object of the present invention is to provide an improved catalyst deterioration diagnosis system for an internal combustion engine provided with a catalytic converter, by which drawbacks encountered in conventional catalyst deterioration diagnosis systems can be effectively overcome.

Another object of the present invention is to provide an improved catalyst deterioration diagnosis system for an internal combustion engine provided with a catalytic converter, which can be prevented from making such an erroneous judgment that a catalyst is judged as being deteriorated even though it has actually not deteriorated and has a normal ability.

A further object of the present invention is to provide an improved catalyst deterioration diagnosis system for an internal combustion engine provided with an air-fuel ratio feedback control system and a catalytic converter, by which diagnosis of deterioration of a catalyst can be accomplished with a high precision even though a control frequency of air-fuel ratio feedback control is lowered owing to deterioration of an air-fuel ratio sensor disposed upstream of the catalytic converter.

A general aspect of the present invention resides in a catalyst deterioration diagnosis system (D) for an internal combustion engine (E) having an exhaust gas passageway (23) in which a catalytic converter (27) having a catalyst (27a) is disposed, the diagnosis system comprising: a first air-fuel ratio sensor (1, 28) disposed in the exhaust gas passageway and upstream of the catalytic converter; a second air-fuel ratio sensor (2, 29) disposed in the exhaust gas passageway and downstream of the catalytic converter; means (3, 32) for setting a basic fuel injection amount (Tp) in accordance with an engine operating condition of the engine; means (4, 32) for calculating an air-fuel ratio feedback correction coefficient (α); means (5, 32) for correcting the basic fuel injection amount in accordance with the feedback correction coefficient; and means (32) for judging deterioration of the catalyst by comparing an inversion slate of an output signal of the first and second air-fuel ratio sensors, with a decision standard which is set in accordance with a control frequency of an air-fuel ratio feedback control mede at least in response to an output signal from the first air-fuel ratio sensor and the corrected basic fuel injection amount from the correcting means.

With this aspect, diagnosis of deterioration of the catalyst can be accomplished with a high precision even though a control frequency of air-fuel ratio feedback control is lowered owing to deterioration of the first or upstream-side air-fuel ratio sensor, thus effectively avoiding an erroneous judgment of deterioration of the catalyst.

Figure 1:
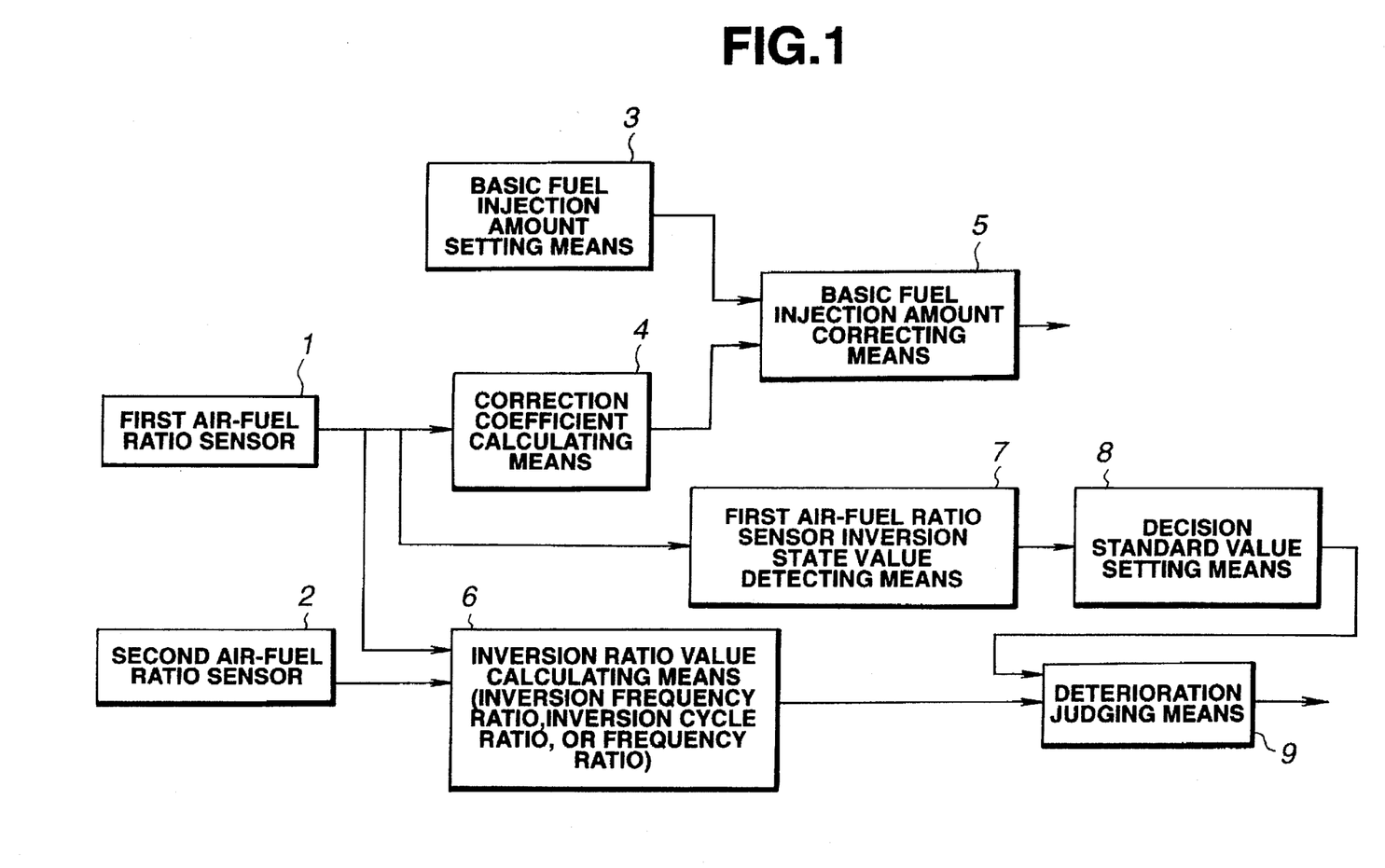
FIG. 1 is a block diagram showing an aspect of a catalyst deterioration diagnosis system according to the present invention.

A first aspect of the present invention resides, as shown in FIG. 1, in a catalyst deterioration diagnosis system (D) for an internal combustion engine (E) having an exhaust gas passageway (23) in which a catalytic converter (27) having a catalyst (27a) is disposed, the diagnosis system comprising: a first air-fuel ratio sensor (1, 28) disposed in the exhaust gas passageway and upstream of the catalytic converter; a second air-fuel ratio sensor (2, 29) disposed in the exhaust gas passageway and downstream of the catalytic converter; means (3, 32) for setting a basic fuel injection amount (Tp) in accordance with an engine operating condition of the engine; means (4, 32) for calculating an air-fuel ratio feedback correction coefficient (α); means (5, 32) for correcting the basic fuel injection amount in accordance with the feedback correction coefficient; means (6, 32) for calculating an inversion ratio value (HZRATE) relating to an inversion ratio (HZR) of output signals from the first and second air-fuel ratio sensors when the engine operating condition is within a diagnosis region requiring a diagnosis of deterioration of the catalyst; means (7, 32) for detecting an inversion state value (AVEHZ) relating to a state of inversion of the output signal of the first air-fuel ratio sensor; means (8, 32) for setting a decision standard value (CNGST) in accordance with the inversion state value from the inversion state value detecting means; and means (9, 32) for judging the deterioration of the catalyst by comparing the inversion ratio value from the inversion ratio value calculating means with the decision standard value from the decision standard value setting means.

With this aspect, the air-fuel ratio of air-fuel mixture to be supplied to the engine is feedback-controlled in response to the output signal from the first or upstream-side air-fuel ratio sensor, so that the air-fuel ratio is maintained at a value near the stoichiometric air-fuel ratio under a proportional plus integral control, repeating its fine fluctuations or changes. The output signal of the first or upstream-side air-fuel ratio sensor periodically makes its inversion between its high and low oxygen concentration sides, in accordance with actual changes of the air-fuel ratio; however, the output signal of the second or downstream-side air-fuel ratio sensor makes its very gentle change so that the frequency of inversion between its high and low oxygen concentration sides is low, in case that the catalyst is normal. The frequency of the invention of the downstream-side air-fuel ratio sensor becomes high in case that the catalyst has deteriorated. Accordingly, deterioration of the catalyst can be judged by obtaining the inversion ratio (such as an inversion frequency ratio, an inversion cycle ratio, and a frequency ratio between the output signals from the first and second air-fuel ratio sensors). Even in case that the cycle of the air-fuel ratio feedback control is prolonged owing to the deterioration of the upstream-side air-fuel ratio sensor so as to enlarge the change of air-fuel ratio, the decision standard value to be used for the catalyst deterioration diagnosis is set in accordance with the control cycle or frequency of the air-fuel ratio feedback control.

A second aspect of the present invention resides in a catalyst deterioration diagnosis system (D) for an internal combustion engine (E) having an exhaust gas passageway (23) in which a catalytic converter (27) having a catalyst (27a) is disposed, the diagnosis system comprising: a first air-fuel ratio sensor (1, 28) disposed in the exhaust gas passageway and upstream of the catalytic converter; a second air-fuel ratio sensor (2, 29) disposed in the exhaust gas passageway and downstream of the catalytic converter; means (3, 32) for setting a basic fuel injection amount (Tp) in accordance with an engine operating condition of the engine; means (4, 32) for calculating an air-fuel ratio feedback correction coefficient (α); means (5, 32) for correcting the basic fuel injection amount in accordance with the feedback correction coefficient; means (32) for detecting that inversion frequency of an output signal from the first air-fuel ratio sensor reaches a predetermined level (CMSW) when the engine operating condition is within a diagnosis region requiring a diagnosis of deterioration of the catalyst; means (32) for measuring a time duration in which the predetermined level of the inversion frequency of the output signal from the first air-fuel ratio sensor is reached; means for calculating a lapsed time value (AVEHZ) in accordance with the time duration; means (32) for calculating a ratio (HZR) between an inversion frequency of the output signal from the first air-fuel ratio sensor and an inversion frequency of the output signal from the second air-fuel ratio sensor within the time duration; means (32) for setting a decision standard value (CNGST) in accordance with this lapsed time value from the lapsed time value calculating means; and means (32) for judging the deterioration of the catalyst by comparing the inversion frequency ratio from the inversion frequency ratio calculating means with the decision standard value from the decision standard value setting means.

With this aspect, the judgment of the catalyst deterioration is made in accordance with the inversion frequency ratio between th output signals of the first or upstream-side air-fuel ratio sensor and the second or downstream-side air-fuel ratio sensor. Additionally, the decision standard value is set in accordance with the time duration within which the inversion frequency of the output signal of the upstream-side air-fuel ratio sensor reaches the predetermined value. Thus, comparison in inversion condition of the output signal of the upstream and downstream side oxygen sensors can be easily accomplished with the inversion frequency ratio. Additionally, the control frequency of the air-fuel ratio feedback control can be easily measured with the lapsed time value relating to the time duration within which the inversion frequency of the output signal of the upstream-side oxygen sensor reaches the predetermined level.

A third aspect of the present invention resides in a catalyst deterioration diagnosis system (D) for an internal combustion engine (E) having an exhaust gas passageway (23) in which a catalytic converter (27) having a catalyst (27a) is disposed, the diagnosis system comprising: a first air-fuel ratio sensor (1, 28) disposed in the exhaust gas passageway and upstream of the catalytic converter; a second air-fuel ratio sensor (2, 29) disposed in the exhaust gas passageway and downstream of the catalytic converter; means (3, 32) for setting a basic fuel injection amount (Tp) in accordance with an engine operating condition of the engine; means (4, 32) for calculating an air-fuel ratio feedback correction coefficient (α); means (5, 32) for correcting the basic fuel injection amount in accordance with the feedback correction coefficient; means (32) for detecting that inversion frequency of an output signal from the first air-fuel ratio sensor reaches a predetermined level (CMSW) when the engine operating condition is within a diagnosis region requiring a diagnosis of deterioration of the catalyst; means (32) for measuring a title duration in which the predetermined level of the inversion frequency of the output signal from the first air-fuel ratio sensor is reached; means (32) for calculating a ratio (HZR) between an inversion frequency of the output signal from the first air-fuel ratio sensor and an inversion frequency of the output signal from the second air-fuel ratio sensor within the time duration; means (32) for averaging the inversion frequency ratio through a plurality of time durations thereby to obtain an average inversion frequency ratio (HZRATE); means (32) for averaging the time duration through a plurality of time durations thereby to obtain an average time duration (AVEHZ); means (32) for setting a decision standard value (CNGST) in accordance with the average time duration from the time duration averaging means; and means (32) for judging the deterioration of the catalyst by comparing the average inversion frequency ratio (HZRATE) from the inversion frequency ratio averaging means with the decision standard value from the decision standard value setting means.

With this aspect, judgment of the catalyst deterioration is made in accordance with the average value of the invention frequency ratio and with the average value of the time duration, thereby further improving the precision of the diagnosis.

A fourth aspect of the present invention resides in a catalyst deterioration diagnosis system (D) for an internal combustion engine (E) having an exhaust gas passageway (23) in which a catalytic converter (27) having a catalyst (27a) is disposed, the diagnosis system comprising: a first air-fuel radio sensor (1, 28) disposed in the exhaust gas passageway and upstream of the catalytic converter; a second air-fuel ratio sensor (2, 29) disposed in the exhaust gas passageway and downstream of the catalytic converter; means (3, 32) for setting a basic fuel injection amount (Tp) in accordance with an engine operating condition of the engine; means (4, 32) for calculating an air-fuel ratio feedback correction coefficient; means (5, 32) for correcting the basic fuel injection amount in accordance with the feedback correction coefficient (α); means (32) for detecting that inversion frequency of an output signal from the first air-fuel ratio sensor reaches a predetermined level (CMSW) when the engine operating condition is within a diagnosis region requiring a diagnosis of deterioration of the catalyst; means (32) for measuring a time duration in which the predetermined level of the inversion frequency of the output signal from the first air-fuel ratio sensor is reached; means (32) for calculating a ratio (HZR) between an inversion frequency of the output signal from the first air-fuel ratio sensor and an inversion frequency of the output signal from the second air-fuel ratio sensor within the time duration; means (32) for averaging the inversion frequency ratio through a plurality of time durations thereby to obtain an average inversion frequency ratio (HZRATE); means (32) for measuring an inversion frequency (FO2CT) of the output signal of the first air-fuel ratio sensor within the time duration; means (32) for averaging the inversion frequency (FO2CT) of the inversion frequency measuring means through a plurality of time durations thereby to obtain an average inversion frequency; means (32) for setting a decision standard value (CNGST) in accordance with the average inversion frequency from the inversion frequency averaging means; and means (32) for judging the deterioration of the catalyst by comparing the average inversion frequency ratio (HZRATE) from the inversion frequency ratio averaging means with the decision standard value from the decision standard value setting means.

With this aspect, the decision standard value for judgment of the catalyst deterioration is set in accordance with the inversion frequency of the output signal of the first or upstream-side air-fuel ratio sensor, more specifically with the average value of the inversion frequency through a plurality of the time durations, thereby further improving the precision of the diagnosis.

Figure 2:
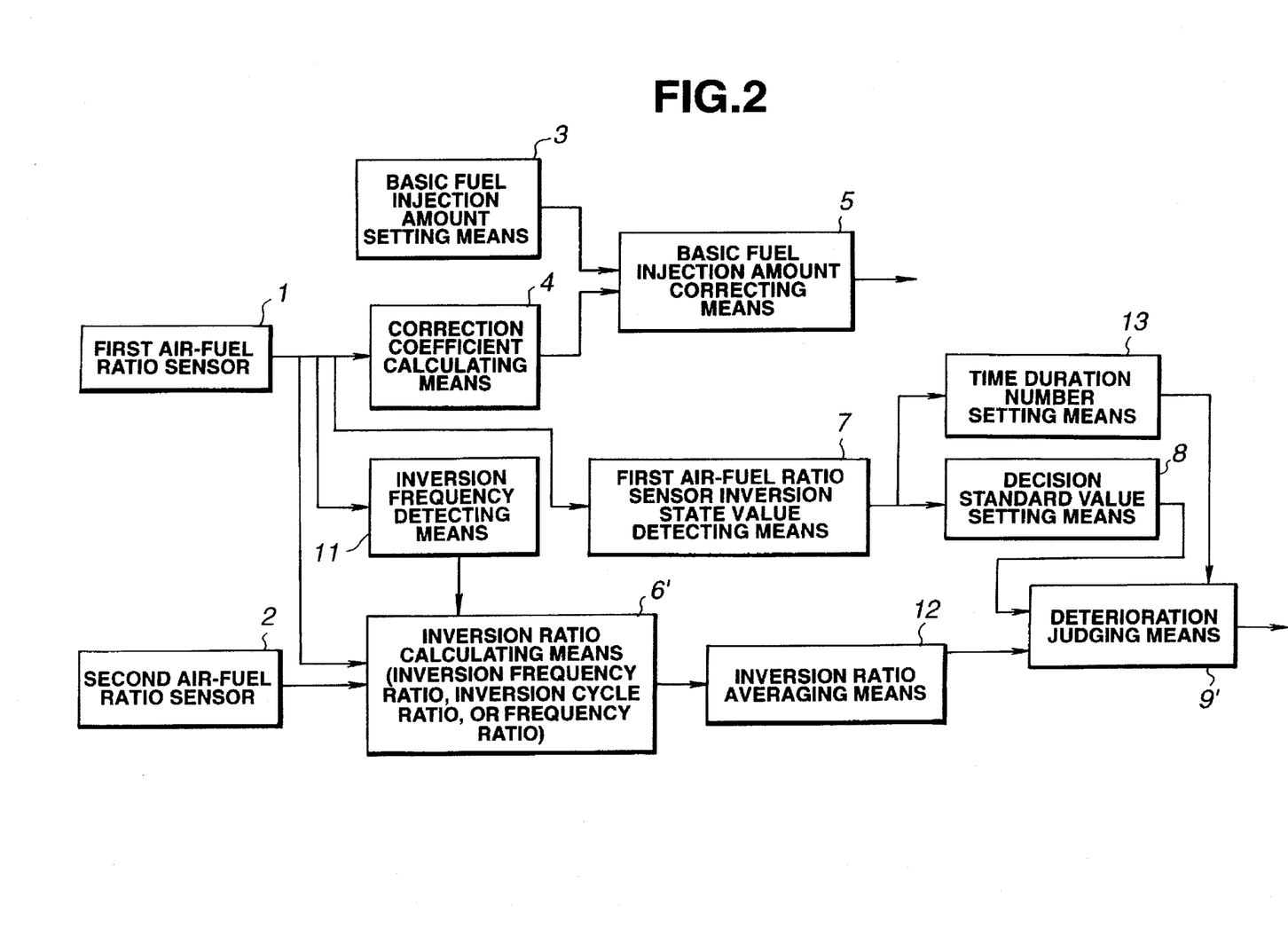
FIG. 2 is a block diagram showing another aspect of the catalyst deterioration diagnosis system according to the present invention.

A fifth aspect of the present invention resides, as shown in FIG. 2, in a catalyst deterioration diagnosis system (D) for an internal combustion engine (E) having an exhaust gas passageway (23) in which a catalytic converter (27) having a catalyst (27a) is disposed, the diagnosis system comprising: a first air-fuel ratio sensor (1, 28) disposed in the exhaust gas passageway and upstream of the catalytic converter; a second air-fuel ratio sensor (2, 29) disposed in the exhaust gas passageway and downstream of the catalytic converter; means (3, 32) for setting a basic fuel injection amount (Tp) in accordance with an engine operating condition of the engine; means (4, 32) for calculating an air-fuel ratio feedback correction coefficient (α); means (5, 32) for correcting the basic fuel injection amount in accordance with the feedback correction coefficient; means (11, 32) for detecting that inversion frequency of an output signal from the first air-fuel ratio sensor reaches a predetermined level (CMSW) when the engine operating condition is within a diagnosis region requiring a diagnosis of deterioration of the catalyst; means (11, 32) for measuring a time duration in which the predetermined level of the inversion frequency of the output signal from the first air-fuel ratio sensor is reached; means (6', 32) for calculating an inversion ratio (HZR) of output signals from the first and second air-fuel ratio sensors within the time duration; means (12, 32) for averaging the inversion ratio (HZR) of the inversion ratio calculating means through a plurality of time durations thereby to obtain an average inversion ratio (HZRATE); means (7, 32) for detecting an inversion state value (AVEHZ) relating to a state of inversion of the output signal of the first air-fuel ratio sensor; means (8, 32) for setting a decision standard value (CNGST) in accordance with the inversion state value (AVEHZ) from the inversion state value detecting means; means (13, 32) for setting a number (MUMMAX) of time durations required for the catalyst deterioration diagnosis, in accordance with the inversion state value (AVEHZ) from the inversion state value detecting means; and means (9', 32) for judging the deterioration of the catalyst by comparing the average inversion ratio (HZRATE) from the inversion ratio averaging means with the decision standard value from the decision standard value setting means after lapse of the number (NUMMAX) of time durations of the time duration number setting means.

With this aspect, the number of the time durations required for the diagnosis is suitably set in accordance with the inversion state value in order to obtain the average value of the inversion ratio between the output signals of the first or upstream-side and second or downstream-side air-fuel ratio sensors, thereby achieving the diagnosis in a further high precision with a short period of time.

A sixth aspect of the present invention resides in a catalyst deterioration diagnosis system (D) for an internal combustion engine (E) having an exhaust gas passageway (23) in which a catalytic converter (27) having a catalyst (27a) is disposed, the diagnosis system comprising: a first air-fuel ratio sensor (1, 28) disposed in the exhaust gas passageway and upstream of the catalytic converter; a second air-fuel ratio sensor (2, 29) disposed in the exhaust gas passageway and downstream of the catalytic converter; means (3, 32) for setting a basic fuel injection amount (Tp) in accordance with an engine operating condition of the engine; means (4, 32) for calculating an air-fuel ratio feedback correction coefficient (α); means (5, 32) for correcting the basic fuel injection amount in accordance with the feedback correction coefficient; means (32) for detecting that inversion frequency of an output signal from the first air-fuel ratio sensor reaches a predetermined level (CMSW) when the engine operating condition is within a diagnosis region requiring a diagnosis of deterioration of the catalyst; means (32) for measuring a time duration in which the predetermined level of the inversion frequency of the output signal from the first air-fuel ratio sensor is reached; means (32) for calculating a ratio (HZR) between an inversion frequency of the output signal from the first air-fuel ratio sensor and an inversion frequency of the output signal from the second air-fuel ratio sensor within the time duration; means (32) for averaging the inversion frequency ratio (HZR) through a plurality of time durations thereby to obtain an average inversion frequency ratio (HZRATE); means (32) for averaging the time duration through a plurality of time durations thereby to obtain an average time duration (AVEHZ); means (32) for setting a decision standard value (CNGST) in accordance with the average time duration (AVEHZ) of the time duration averaging means; means (32) for setting a number (NUMMAX) of time durations required for the catalyst deterioration diagnosis, in accordance with the averaged time duration (AVEHZ); and means (32) for judging the deterioration of the catalyst by comparing the average inversion frequency ratio (HZRATE) of the inversion frequency ratio averaging means with the decision standard value (CNGST) of the decision standard value setting means.

With this aspect, judgment of the catalyst deterioration is made in accordance with the average value of the inversion frequency ratio between the output signals of the first or upstream-side and second or downstream-side air-fuel ratio sensors. The decision standard value and the number of the time durations are set in accordance with the average value of the time duration. Accordingly, comparison in inversion condition of the output signals of the upstream-side and downstream-side oxygen sensors can be easily accomplished with the inversion frequency ratio. Additionally, the control frequency of the air-fuel ratio feedback control can be easily measured with the lapsed time value relating to the time duration.

DETAILED DESCRIPTION OF THE INVENTION

Figure 3:
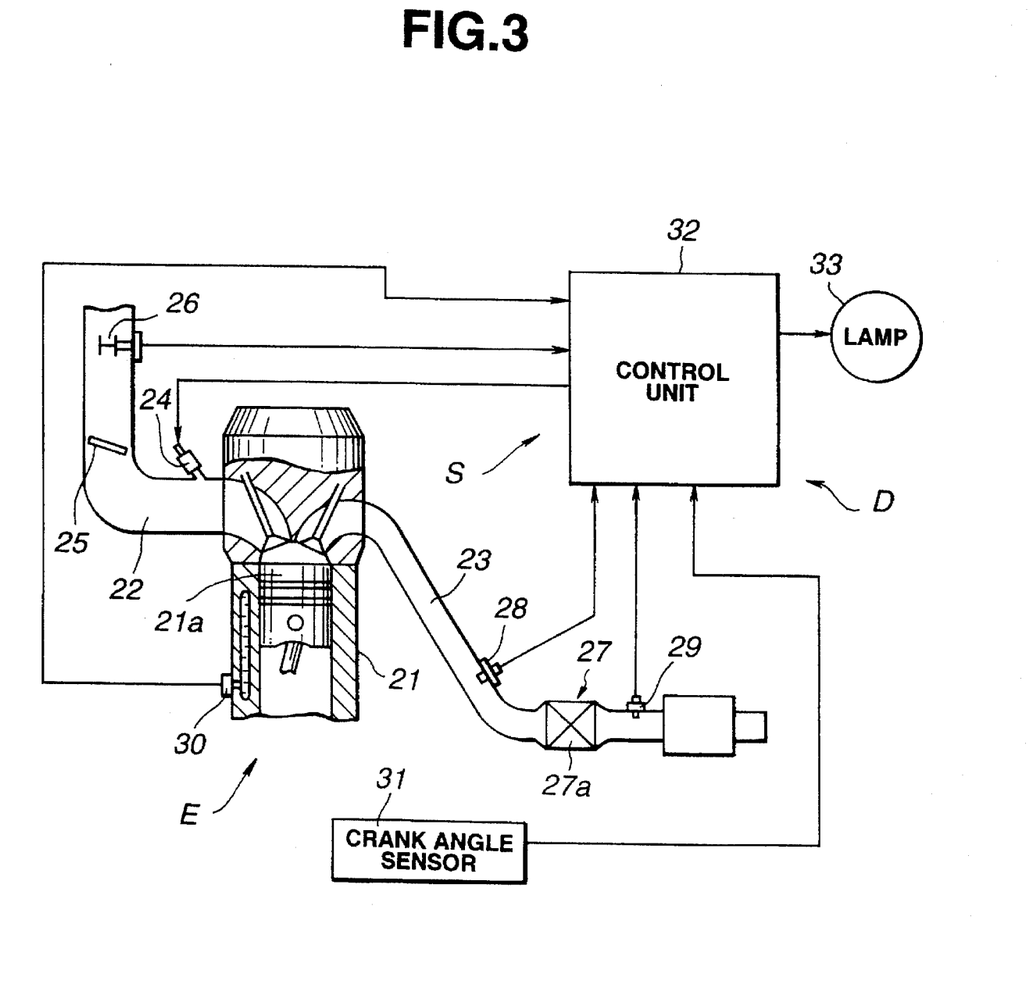
FIG. 3 is a schematic illustration of an embodiment of the catalyst deterioration diagnosis system according to the present invention.

Referring now to FIG. 3 of the drawings, an embodiment of a catalyst diagnosis system according to the present invention is illustrated by a reference character D and shown to be incorporated with an automotive internal combustion engine E. The engine E includes an engine body 21 which is provided with an intake air passageway 22 through which intake air is introduced into the engine body 21, and an exhaust gas passageway 23 through which exhaust gas from the engine body 21 is discharged to ambient air. Fuel injector valves (only one shown) 24 are disposed in the intake air passageway 22 to inject fuel to the respective intake ports (respectively corresponding to engine cylinders 21a) formed in the engine body 21. A throttle valve 25 is disposed in the intake air passageway 22 upstream of the fuel injector valves 24 to control the amount of air to be introduced into the engine body 21. An air-flow meter 26 of, for example, a hot-wire mass air-flow sensor type is disposed in the intake air passageway 22 upstream of the throttle valve 25 and adapted to produce an electrical detection signal representative of the amount of air flowing in the intake air passageway 22.

A catalytic converter 27 is disposed in the exhaust gas passageway 23 and includes a catalyst 27a such as a three-way catalyst for oxidizing CO (carbon monoxide) and HC (hydrocarbons) and reducing NOx (nitrogen oxides) so as to purify exhaust gas from the engine body 21. An upstream-side oxygen sensor 28 and a downstream-side oxygen sensor are disposed respectively on upstream and downstream sides of the catalytic converter 27. Each oxygen sensor 28, 29 serves as an air-fuel ratio sensor and is adapted to produce a voltage output (electromotive force) in accordance with the concentration of residual oxygen in exhaust gas flowing through the exhaust gas passageway 23. The electromotive force produced by the oxygen sensor 28 abruptly changes at the stoichiometric air-fuel ratio (as a border) of air-fuel mixture supplied to the engine cylinders 21a of the engine body 21, so that the electromotive force takes its high level (about 1 V) in case that the air-fuel mixture is on a rich (in fuel) side and takes its low level (about 100 mV) in case that the air-fuel mixture is On a lean (in fuel) side. Thus, each oxygen sensor 28, 29 is adapted to produce an electrical detection or output signal representative of the oxygen concentration in exhaust gas.

An engine coolant temperature sensor 30 is disposed in a coolant passage (no numeral) formed in the engine body 21 to detect the temperature of engine coolant. The engine coolant temperature sensor 30 is adapted to produce an electrical detection signal representative of the engine coolant temperature. A crank angle sensor 31 is provided and adapted to produce a pulse signal (detection signal) at intervals of a predetermined crank angle (rotational angle of a crankshaft of the engine) thereby detecting an engine speed of the engine.

The detection or output signals from the air flow meter 26, the oxygen sensors 28, 29, the engine coolant temperature sensor 30, and the crank angle sensor 31 are transmitted to a control unit 32 including a so-called microcomputer system. The control unit 32 is arranged to control the amount of fuel to be injected from each fuel injector valve 24 in accordance with the detection signal from the oxygen sensor 28, 29 thereby accomplishing the control of air-fuel ratio of air-fuel mixture to be supplied to the engine cylinders 21a of the engine body 21 under a feedback control. The control unit 32 forms part of an air-fuel ratio feedback control system S which is arranged to regulate the air-fuel ratio of the air-fuel mixture to be supplied to the engine cylinders eta to values near the stoichiometric air-fuel ratio under the feedback control, thereby accomplishing a so-called air-fuel ratio feedback control. It will be understood that the three-way catalyst 27a can be effectively activated when the air-fuel ratio of the air-fuel mixture is at the values near the stoichiometric air-fuel ratio. Additionally, the control unit 32 is arranged to diagnose deterioration of the catalyst in the catalytic converter, lighting a warning lamp 33 in case that the control unit makes such a judgment that the deterioration of the catalyst exceeds a predetermined level.

Next, a manner of operation of the catalyst deterioration diagnosis system D will be discussed hereinafter with reference to a flowchart in FIG. 5.

First, the air-fuel ratio feedback control under the action of the air-fuel ratio feedback control system S will be discussed. In this air-fuel ratio control, a basic pulse width (basic fuel injection amount) Tp is calculated in accordance with an intake air amount represented by the detection signal from the air flow meter 26 and with the engine speed represented by the detection signal from the crank angle sensor 31. The basic pulse width corresponds to a time duration for which the fuel injector valve 24 opens to inject fuel, and therefore corresponds to the basic fuel injection amount which is a basic amount of fuel to be injected from each fuel injector valve 24. The intake air amount is the amount of intake air flowing in the intake passageway 22.

The basic pulse width Tp is supplied with various corrections thereby to determine a driving pulse width Ti (an actual fuel injection amount) which corresponds to a time duration for which the fuel injector valve 24 actually open to inject fuel. More specifically, the driving pulse width Ti is calculated according to the following equation:

$$Ti = Tp \times COEF \times \alpha + Ts$$

where COEF is a variety of correction coefficients for increasing the fuel injection amount, for example, in accordance with the engine coolant temperature and/or with a high engine speed and load engine operating condition; Ts is a correction coefficient according to a battery voltage to compensate inoperative time of the fuel injector valve 24; and $\alpha$ is an air-fuel ratio feedback correction coefficient which is calculated mainly in accordance with the detection signal from the upstream-side oxygen sensor 28.

As shown at the lower part of FIG. 8, the air-fuel ratio feedback correction coefficient $\alpha$ is a value which is obtained by a false proportional plus integral control depending on inversion between the low and high oxygen concentration sides of the detection or output signal of the upstream-side oxygen sensor 28 relative to the slice level corresponding to the stoichiometric air-fuel ratio. It will be understood that the low oxygen concentration side corresponds to the rich side of the air-fuel ratio (air-fuel mixture), while the high oxygen concentration side corresponds to the lean side of the air-fuel ratio (air-fuel mixture). More specifically, when a curve of the output signal of the oxygen sensor crosses the line of the slice level corresponding to the stoichiometric air-fuel ratio so as to be inverted from the low oxygen concentration side to the high oxygen concentration side, the predetermined proportional amount PL is added to the feedback correction coefficient $\alpha$, and additionally the integral amount with an inclination corresponding to a predetermined integration constant IL is gradually added to the feedback correction coefficient $\alpha$, as shown at the lower part of FIG. 8. Accordingly, the air-fuel ratio is controlled to its rich side in case that the feedback correction coefficient $\alpha$ is not less than 1 and to its lean side in case that the feedback correction coefficient $\alpha$ is not more than 1. Thus, actual air-fuel ratio of air-fuel mixture to be supplied to the engine cylinders 21a of the engine is maintained at values near the stoichiometric value, while changing with a cycle of about 1 to 2 Hz.

Here, the cycle of change of the actual air-fuel ratio (i.e., a control period of the air-fuel ratio feedback control) depends on a control delay of a whole control system, so that the change cycle of the actual air-fuel ratio is largely affected by a (high or low) response characteristics of the upstream-side oxygen sensor 28. This will be explained in detail with reference to FIGS. 9A to 9D and 10A to 10D. FIG. 9A to 9D show an operating condition of the air-fuel ratio feedback control system in case that the upstream-side oxygen sensor 28 is in a normal condition and not deteriorated, in which FIG. 9A depicts a voltage output of the upstream-side oxygen sensor 28; FIG. 9B depicts an air-fuel ratio on the upstream side of the catalytic converter 27; FIG. 9C depicts an air-fuel ratio feedback correction efficient $\alpha$; and FIG. 9D depicts a voltage output of the downstream-side oxygen sensor 29. In contrast, FIGS. 10A to 10D show an operating condition of the air-fuel ratio control system in case that the upstream-side oxygen sensor 28 is deteriorated and in an abnormal condition, in which FIG. 10A depicts a voltage output of the upstream-side oxygen sensor 28; FIG. 10B depicts an air-fuel ratio on the upstream side of the catalytic converter 27; FIG. 10C depicts an air-fuel ratio feedback correction efficient $\alpha$; and FIG. 10D depicts a voltage output of the downstream-side oxygen sensor 29. As seen from comparison between the above two-kind conditions of FIGS. 9A to 9D and FIGS. 10A to 10D, the control cycle of the air-fuel ratio feedback control is prolonged when the upstream-side oxygen sensor 28 is deteriorated.

The above feedback control correction amount $\alpha$ is clamped at 1 so that substantially an open loop control is made in case that the engine operation is in a low coolant temperature condition or a high engine speed and load condition requiring a fuel injection amount increase or in case that the engine operation is in a fuel cut condition during a vehicle speed deceleration.

The output or detection signal from the downstream-side oxygen sensor 29 is used to correct a totally one-sided tendency in the air-fuel ratio feedback control depending on the upstream-side oxygen sensor 28. In other words, in case that the air-fuel ratio has a totally rich tendency upon the air-fuel ratio feedback control, the output signal from the downstream-side oxygen sensor 29 is continuous on the low oxygen concentration side. In case that the air-fuel ratio has a totally lean tendency, the output signal from the downstream-side oxygen sensor 29 is continuous on the high oxygen concentration side of the air-fuel ratio. Accordingly, a further high precision air-fuel ratio feedback control can be achieved, for example, by correcting the proportion amounts PL, PR at the inversion of the air-fuel ratio between the rich and lean sides, in accordance with such a totally one-sided tendency of the air-fuel ratio.

Figure 5:
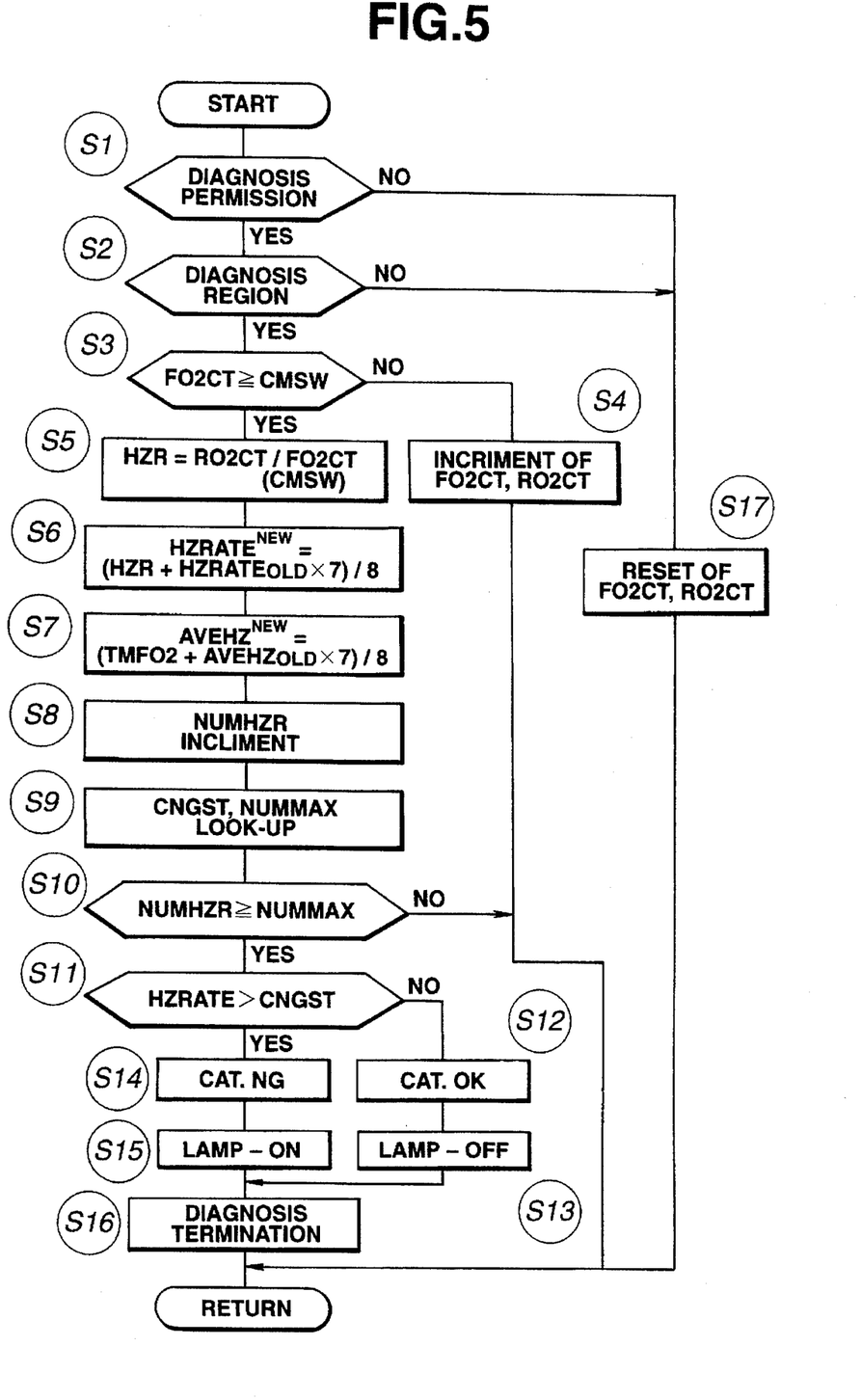
FIG. 5 is a flowchart of program of the catalyst deterioration diagnosis of the embodiment of FIG. 3.

Hereinafter, operation of diagnosing deterioration of the catalyst executed under the action of the control unit 32 will be discussed with reference to the flowchart of FIG. 5 showing a program of catalyst deterioration diagnosis. The routine of this program is repeatedly executed, for example, at intervals of a predetermined time.

First, at a step S1, a judgment is made as to whether diagnosis permission condition is established or not. The diagnosis permission condition consists of (a) a first state in which the temperature of engine coolant at engine starting is not lower than a predetermined level, (b) a second state in which a predetermined time has lapsed after warming-up of the engine, (c) a third state in which the both oxygen sensors 28, 29 are activated (this is judged in accordance with the voltage output level of the sensors 28, 29), (d) a fourth state in which the diagnosis for deterioration of the catalyst 27a has not been completed. When the four states (a) to (d) or the diagnosis permission conditions is established, diagnosis for deterioration of the catalyst 27a is permitted so that a flow goes to a step S2. At the step S2, a judgment is made as to whether the engine operation is within a diagnosis region in which an air-fuel ratio feedback control is to be carried out or not. More specifically, it is judged that the engine operation is within the diagnosis region when (a) a first state in which a vehicle speed VSP is within a predetermined range, (b) a second state in which an engine speed N is within a predetermined range, and (c) a third state in which an engine load (for example, the basic fuel injection amount Tp) is within a predetermined range are all established, and then the flow goes to a step S3.

Figure 4:
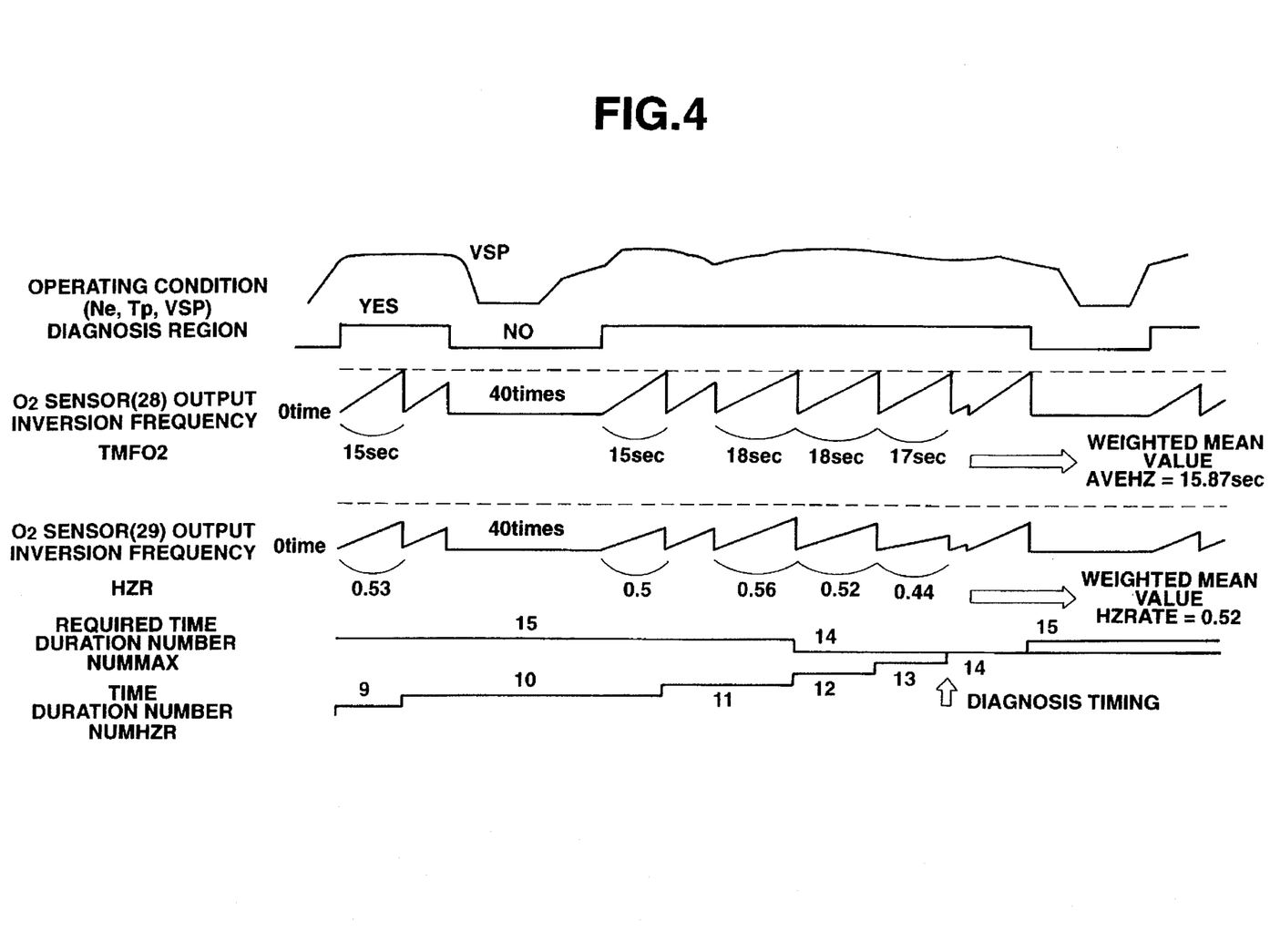
FIG. 4 is a time chart illustrating an example of manner of the catalyst deterioration diagnosis in connection with the embodiment of FIG. 3, showing a timing at which the diagnosis is made.

At the step S3, a judgment is made as to whether a voltage (output) signal inversion frequency FO2CT of the upstream-side oxygen sensor 28 has reached a predetermined level CMSW or not. The voltage signal inversion frequency is the frequency of inversion of the voltage signal between the low oxygen concentration side and the high oxygen concentration side (as shown in FIG. 8) along with the air-fuel ratio feedback control. In case that the voltage signal inversion frequency has not reached the predetermined level CMSW, the flow goes to a step S4 in which the voltage signal inversion frequency FO2CT of the upstream-side oxygen sensor 28 and the voltage signal inversion frequency RO2CT of the downsCream-side oxygen sensor 29 are counted. In case that the voltage signal inversion frequency RO2CT has reached the predetermined level CMSW at the step S3, the flow goes to a step S5. In case that the judgment permission condition becomes not established at the step S1 and the engine operation becomes not within the diagnosis region before the voltage signal inversion frequency has reached the predetermined level CMSW, the values FO2CT, RO2CT counted hitherto is reset as indicated in FIG. 4, at a step S17. FIG. 4 shows a time chart illustrating an actual control state along with the proceeding of the program of FIG. 5, in which numerical examples are added for the purpose of readiness of understanding the present invention.

At the step S5, an inversion frequency ratio HZR is calculated for a time duration for allowing the voltage signal inversion frequency to reach the predetermined value CMSW. The inversion frequency ratio HZR is calculated according to an equation (HZR=RO2CT/FO2CT) using the voltage signal inversion frequency FO2CT of the upstream-side oxygen sensor 28 and the voltage signal inversion frequency RO2CT of the downstream-side oxygen sensor 29. The thus obtained inversion frequency ratio HZR is stored in a memory of the control unit 32. When deterioration of the catalytic converter 27 has proceeded, the voltage signal inversion frequency FO2CT of the downstream-side oxygen sensor 29 increases, and therefore the inversion frequency ratio HZR increases. It will be understood that the inversion frequency ratio HZR may be obtained upon measuring a voltage signal inversion cycle (the cycle of the inversion between the low and high oxygen concentration sides) of each oxygen sensor 28, 29, or measuring a voltage signal frequency (the number of cycles of the inversion between the low and high oxygen concentration sides, in a unit time).

At a step S6, the weighted mean or average of the current value of the inversion frequency ratio HZP is calculated to obtain an average inversion frequency ratio HZRATE within the diagnosis region. In other words, the average inversion frequency ratio HZRATE is calculated according to the following equation using the current inversion frequency ratio HZR and an average inversion frequency ratio HZRATE$_{OLD}$ which is an average value of preceding inversion frequency ratios (at preceding computation cycles):

$$HZRATE=(HZR+HZRATE_{OLD} \times 7)/8$$

After the calculation of the average inversion frequency ratio HZRATE has been completed, the inversion frequency ratio HZR measured at the step 85 is cleared.

A lapsed time THFO2 required for measurement of the above-mentioned inversion frequency ratio HZR is measured in another routine (not shown). The lapsed time TMFO2 is of the time duration for allowing the voltage output inversion frequency FO2CT of the upstream-side oxygen sensor 28 to reach the predetermined level CHSW. At a step S7, the weightedd mean or average of this lapsed time THFO2 is calculated to obtain an average lapsed time AVEHZ. In other words, the average lapsed time AVEHZ is calculated according to the following equation using the current lapsed time TMFO2 and an average lapsed time AVEHZOLD which is an average value of preceding lapsed times (at preceding computation cycles):

$$AVEHZ=(TMFO2+AVEHZ_{OLD} \times 7)/8$$

This average lapsed time AVEHZ represents a control frequency of the air-fuel ratio feedback control.

It will be understood that in the above-mentioned calculation of the weighted mean or average, the initial values of the average inversion frequency ratio HZATE and the average lapsed time AVEHZ are respectively the initial values of the inversion frequency ratio HZR and the lapsed time TMFO2.

At a step S8, increment of a counted value NUMHZR which represents the frequency of the above-mentioned calculation of the weighted mean is made.

Figure 11:
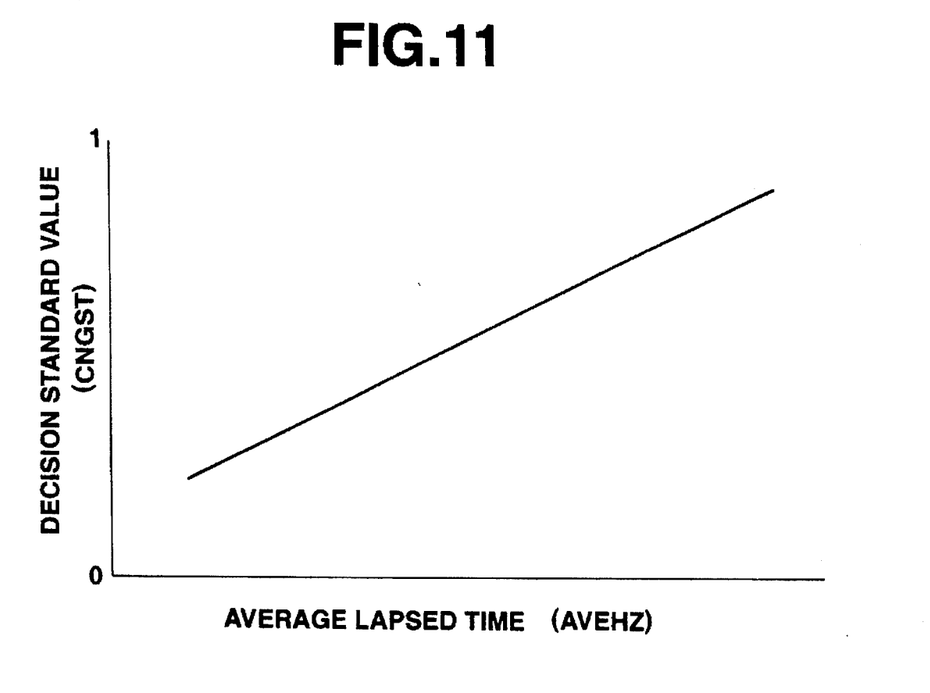
FIG. 11 is a graph showing the relationship between a decision standard value and an average lapsed time in connection with the embodiment of FIG. 3.

At a step S9, a decision standard value CNGST for deterioration of The catalyst 27a and a time duration number NUMMAX (the number of the above-mentioned time duration) required for the diagnosis for the catalyst deterioration are set in accordance with the average lapsed time AVEHZ obtained at the step S7. The decision standard value CNGST is decided with reference to the data table of a characteristics between the decision standard value CNGST and the average lapsed time AVEHZ, shown in FIG. 11. In other words, the decision standard value CNGST is set at a higher value as the average lapsed time AVEHZ becomes longer upon deterioration of the upstream-side oxygen sensor 28.

Figure 12:
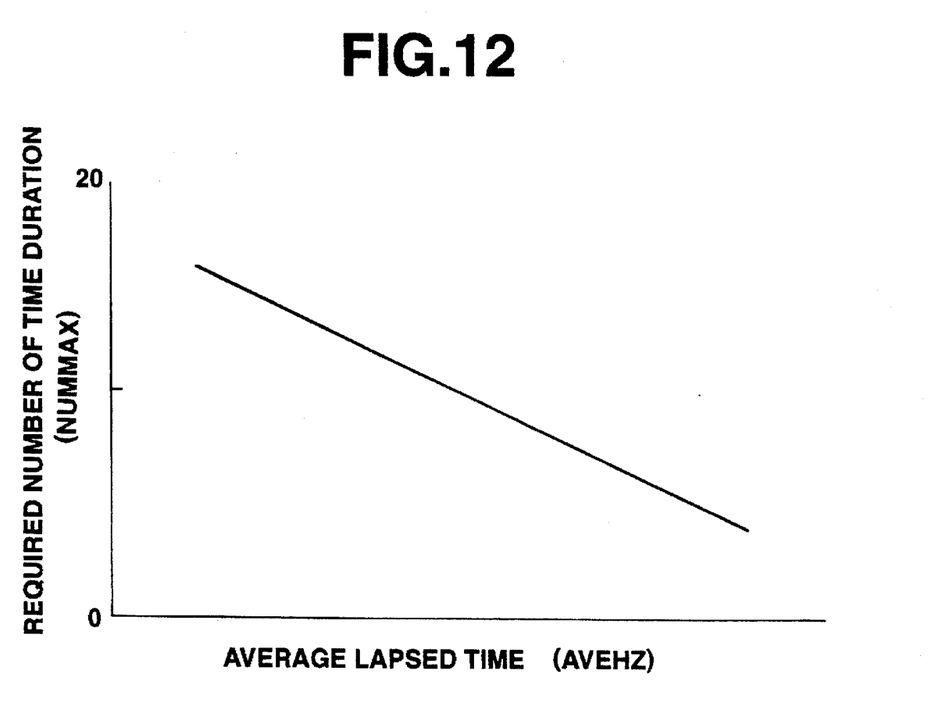
FIG. 12 is a graph showing the relationship between a number of time durations and an average lapsed time in connection with the embodiment of FIG. 3.

The time duration number NUMMAX is decided with reference to the data table of a characteristics between the time duration number NUMMAX and the average lapsed time AVEHZ, shown in FIG. 12. In other words, the time duration number is set at a lower value as the average lapsed time AVEHZ becomes longer upon deterioration of the upstream-side oxygen sensor 28. For example, when the catalyst 27a has sufficiently deteriorated in such a degree that a decision of deterioration of the catalyst 27a is securely made, the voltage signal of the downstream-side oxygen sensor 29 is securely inverted following the air-fuel ratio feedback control in case that the control frequency of the air-fuel ratio feedback control lowers. Accordingly, a precise diagnosis for the catalyst deterioration can be made even if the time duration number NUMMAX for accomplishing calculation of the weighted mean is small, while preventing a diagnosis time (a time required for the diagnosis) from being prolonged with lowering in the control frequency of the air-fuel ratio feedback control. Conversely, in case that the control frequency becomes higher, the voltage signal of the downstream-side oxygen sensor is difficult to follow the air-fuel ratio feedback control even though the catalyst 27a has abnormally deteriorated, and therefore scattering in the inversion frequency ratio HZR in each time duration increases thereby lowering the precision of each data. As a result, the precision is improved by increasing the time duration number hUHMAX as shown in FIG. 12. It will be understood that the diagnosis time itself is not so prolonged even upon increasing the time duration number NUNMAX in case that the control frequency is thus higher.

Next, at a step S10, a decision is made as to whether the counted number or time duration number NUMHZR for accomplishing calculation of the weighted means has reached the required time duration number NUNPLAX. If not reached the required time duration number, a processing including the above-mentioned calculation of the inversion frequency ratio HZR, calculation of the average value AVEHZ, and the like is repeated. At a time point at which calculation of the weighted mean has been carried out by hUHMAX, the flow goes to a step S11 at which a final judgment of deterioration of the catalyst 27a is made. More specifically, the average inversion frequency ratio HZRATE is compared with the above-mentioned decision standard value CNGST. Upon this, if the average inversion frequency ratio HZRATE is not higher than the decision standard CNGST, a judgment is so made that the catalyst 27a has not deteriorated at a step 812, and then the warning lamp 33 is not lighted at a step S13. If the average inversion frequency ratio HZRATE is larger than the decision standard value CNGST, a judgment is so made that the catalyst 27a has deteriorated at a step S14, and then the warning lamp 33 is lighted at a step S15.

Thus, a series of operations for diagnosis of deterioration of the catalyst 27a has been completed, and therefore a flag representing that the diagnosis has been completed is set thereby terminating the processing for the catalyst deterioration diagnosis.

Figure 6:
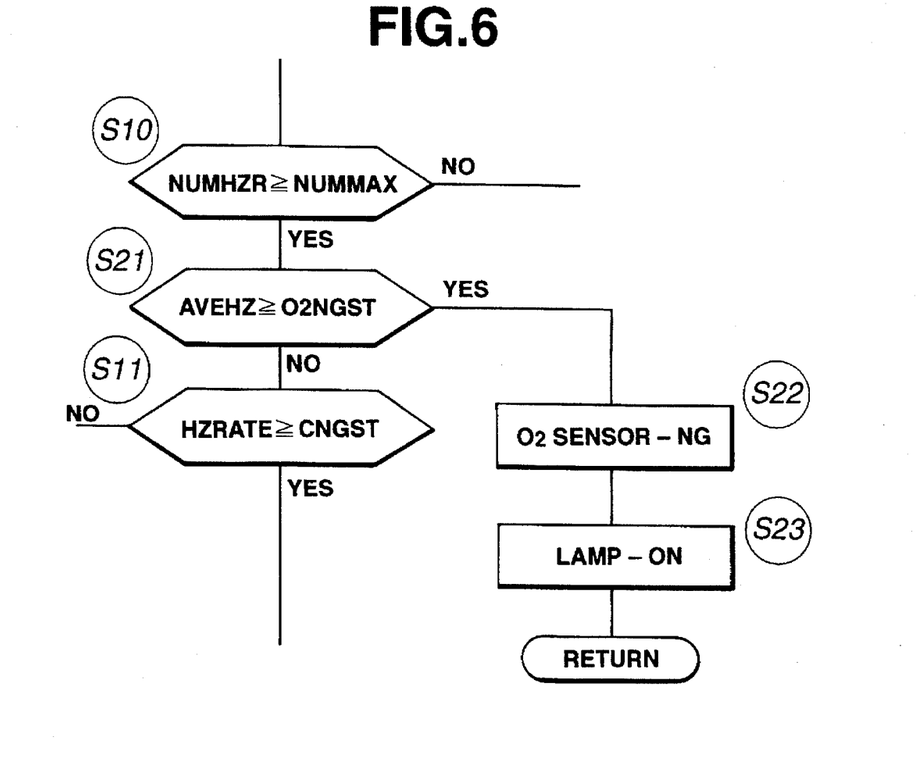
FIG. 6 is a fragmentary flowchart illustrating a manner of the catalyst deterioration diagnosis in another embodiment of the catalyst deterioration diagnosis system according to the present invention.

FIG. 6 shows a part of a flowchart showing a program of a modified embodiments of the catalyst deterioration diagnosis of the present invention which is similar to the program of FIG. 5 except for new steps S21 to S23. It will be understood that the new steps S21 to S23 are added to the flowchart of FIG. 5. Under this program, diagnosis of deterioration of the upstream-side oxygen sensor 28 can be accomplished in addition to accomplishing the catalyst deterioration diagnosis by using the above average lapsed time AVEHZ. Thus, the fragmentary flowchart of FIG. 6 is an essential part of a flowchart provided with a processing of diagnosing deterioration of the upstream-side oxygen sensor 28.

After the step S10, the average lapsed time AVEHZ is compared with its upper limit value O2NGST at a step S21. When the lapsed time AVEHZ is not lower than the upper limit value O2NGST, a judgment is so made that the upstream-side oxygen sensor 28 has deteriorated at a step S22, and then the warning lamp is lighted.

As discussed above, according to the above embodiments, the decision standard value CNGST is set upon taking account of an increase in response delay due to deterioration of the upstream-side oxygen sensor (i.e., lowering in the control frequency of the air-fuel ratio feedback control) in the catalyst deterioration diagnosis by using the inversion frequency ratio between the voltage output inversion frequencies of the upstream-side and downstream-side oxygen sensors 28, 29. As a result, the catalyst deterioration diagnosis can be accomplished in a very high precision.

Additionally, in the above embodiments, the number of the time durations NUMMAX for the diagnosis are suitably set in accordance with the control frequency of the air-fuel ration feedback control, and therefore the diagnosis can be precisely accomplished within a short period of time.

While the inversion frequency ratio HZR between the voltage signal inversion frequencies of the upstream-side and downstream-side oxygen sensors 28, 29 have been shown and described as an inversion ratio, it will be understood that the inversion frequency ratio HZR may be replaced with an inversion cycle ratio or a frequency ratio. The inversion cycle ratio is a ratio between the cycle of the inversion (between the high and low oxygen concentration sides) of the voltage output signal of the upstream-side oxygen sensor 28 and the cycle of the same inversion of the voltage output signal of the downstream-side oxygen sensor 29. The frequency ratio is a ratio between the number of cycles (in a unit time) of the inversion of the voltage output signal of the upstream-side oxygen sensor 28 and the number of cycles (in the unit time) of the inversion of the voltage output signal of the downstream-side oxygen sensor 29.

Although the average lapsed time AVEHZ has been shown and described as representing the control frequency of the air-fuel ratio feedback control, it will be understood that the control frequency may be represented by the voltage signal inversion cycle (the cycle of the inversion between the low and high oxygen concentration sides) of the upstream side oxygen sensor 28 or the voltage signal frequency (the number of cycles of the inversion between the low ad high oxygen concentration sides, in a unit time) of the upstream-side oxygen sensor 28.

What is claimed is:

1. A catalyst deterioration diagnosis system for an internal combustion engine having an exhaust gas passageway in which a catalytic converter having a catalyst is disposed, comprising:

a first air-fuel ratio sensor disposed in the exhaust gas passageway and upstream of the catalytic converter;

a second air-fuel ratio sensor disposed in the exhaust gas passageway and downstream of the catalytic converter;

means for setting a basic fuel injection amount in accordance with an engine operating condition of the engine;

means for calculating an air-fuel ratio feedback correction coefficient;

means for correcting said basic fuel injection amount in accordance with said feedback correction coefficient; and means for judging deterioration of the catalyst by comparing an inversion state of an output signal of said first and second air-fuel ratio sensors, with a decision standard which is set in accordance with a control frequency of an air-fuel ratio feedback control made at least in response to an output signal from said first air-fuel ratio sensor and the corrected basic fuel injection amount from said correcting means.

2. A catalyst deterioration diagnosis system for an internal combustion engine having an exhaust gas passageway in which a catalytic converter having a catalyst is disposed, said diagnosis system comprising:

a first air-fuel ratio sensor disposed in the exhaust gas passageway and upstream of the catalytic converter;

a second air-fuel ratio sensor disposed in the exhaust gas passageway and downstream of the catalytic converter;

means for setting a basic fuel injection amount in accordance with an engine operating condition of the engine;

means for calculating an air-fuel ratio feedback correction coefficient;

means for correcting said basic fuel injection amount in accordance with said feedback correction coefficient;

means for calculating an inversion ratio value relating to an inversion ratio of output signals from said first and second air-fuel ratio sensors when the engine operating condition is within a diagnosis region requiring a diagnosis of deterioration of the catalyst;

means for detecting an inversion state value relating to a state of inversion of the output signal of said first air-fuel ratio sensor;

means for setting a decision standard value in accordance with said inversion state value from said inversion state value detecting means; and means for judging the deterioration of the catalyst by comparing said inversion ratio value from said inversion ratio value calculating means with said decision standard value from said decision standard value setting means.

3. A catalyst deterioration diagnosis system as claimed in claim 2, wherein said inversion ratio is one of said inversion frequency ratio, an inversion cycle ratio, and a frequency ratio between the output signals from said first and second air-fuel ratio sensors, wherein said inversion state value is one of said inversion frequency, an inversion cycle, and a frequency of the output signal from said first air-fuel ratio sensor.

4. A catalyst deterioration diagnosis system for an internal combustion engine having an exhaust gas passageway in which a catalytic converter having a catalyst is disposed, comprising:

a first air-fuel ratio sensor disposed in the exhaust gas passageway and upstream of the catalytic converter;

a second air-fuel ratio sensor disposed in the exhaust gas passageway and downstream of the catalytic converter;

means for setting a basic fuel injection amount in accordance with an engine operating condition of the engine;

means for calculating an air-fuel ratio feedback correction coefficient;

means for correcting said basic fuel injection amount in accordance with said feedback correction coefficient;

means for detecting that inversion frequency of an output signal from said first air-fuel ratio sensor reaches a predetermined level when the engine operating condition is within a diagnosis region requiring a diagnosis of deterioration of the, catalyst;

means for measuring a time duration in which said predetermined level of the inversion frequency of the output signal from said first air-fuel ratio sensor is reached;

means for calculating a lapsed time value in accordance with said time duration;

means for calculating a ratio between an inversion frequency of the output signal from said first air-fuel ratio sensor and an inversion frequency of the output signal from said second air-fuel ratio sensor within said time duration;

means for setting a decision standard value in accordance with this lapsed time value from said lapsed time value calculating means; and means for judging the deterioration of the catalyst by comparing said inversion frequency ratio from said inversion frequency ratio calculating means with said decision standard value from said decision standard value setting means.

5. A catalyst deterioration diagnosis system for an internal combustion engine having an exhaust gas passageway in which a catalytic converter having a catalyst is disposed, said diagnosis system comprising:

a first air-fuel ratio sensor disposed in the exhaust gas passageway and upstream of the catalytic converter;

a second air-fuel ratio sensor disposed in the exhaust gas passageway and downstream of the catalytic converter;

means for setting a basic fuel injection amount in accordance with an engine operating condition of the engine;

means for calculating an air-fuel ratio feedback correction coefficient;

means for correcting said basic fuel injection amount in accordance with said feedback correction coefficient;

means for detecting that inversion frequency of an output signal from said first air-fuel ratio sensor reaches a predetermined level when the engine operating condition is within a diagnosis region requiring a diagnosis of deterioration of the catalyst;

means for measuring a time duration in which said predetermined level of the inversion frequency of the output signal from said first air-fuel ratio sensor is reached;

means for calculating a ratio between an inversion frequency of the output signal from said first air-fuel ratio sensor and an inversion frequency of the output signal from said second air-fuel ratio sensor within said time duration;

means for averaging said inversion frequency ratio through a plurality of time durations thereby to obtain an average inversion frequency ratio;

means for averaging said time duration through a plurality of time durations thereby to obtain an average time duration;

means for setting a decision standard value in accordance with said average time duration from said time duration averaging means; and means for judging the deterioration of the catalyst by comparing said average inversion frequency ratio from said inversion frequency ratio averaging means with said decision standard value from said decision standard value setting means.

6. A catalyst deterioration diagnosis system for an internal combustion engine having an exhaust gas passageway in which a catalytic converter having a catalyst is disposed, said diagnosis system comprising:

a first air-fuel ratio sensor disposed in the exhaust gas passageway and upstream of the catalytic converter;

a second air-fuel ratio sensor disposed in the exhaust gas passageway and downstream of the catalytic converter;

means for setting a basic fuel injection amount in accordance with an engine operating condition of the engine;

means for calculating an air-fuel ratio feedback correction coefficient;

means for correcting said basic fuel injection amount in accordance with said feedback correction coefficient;

means for detecting that inversion frequency of an output signal from said first air-fuel ratio sensor reaches a predetermined level when the engine operating condition is within a diagnosis region requiring a diagnosis of deterioration of the catalyst;

means for measuring a time duration in which said predetermined level of the inversion frequency of the output signal from said first air-fuel ratio sensor is reached;

means for calculating a ratio between an inversion frequency of the output signal from said first air-fuel ratio sensor and an inversion frequency of the output signal from said second air-fuel ratio sensor within said time duration;

means for averaging said inversion frequency ratio through a plurality of time durations thereby to obtain an average inversion frequency ratio;

means for measuring an inversion frequency of the output signal of said first air-fuel ratio sensor within said time duration;

means for averaging said inversion frequency of said inversion frequency measuring means through a plurality of time durations thereby to obtain an average inversion frequency;

means for setting a decision standard value in accordance with said average inversion frequency from said inversion frequency averaging means; and means for judging the deterioration of the catalyst by comparing said average inversion frequency ratio from said inversion frequency ratio averaging means with said decision standard value from said decision standard value setting means.

* * * * *